United States Patent [19]
Eichfeld et al.

[11] Patent Number: 5,524,174
[45] Date of Patent: Jun. 4, 1996

[54] APPARATUS FOR INFERENCE FORMATION AND DEFUZZIFICATION IN A HIGH-DEFINITION FUZZY LOGIC CO-PROCESSOR

[75] Inventors: Herbert Eichfeld; Markus Waidelich, both of Munich, Germany

[73] Assignee: Siemens Aktiengesellschaft, Munich, Germany

[21] Appl. No.: 220,531

[22] Filed: Mar. 31, 1994

[30] Foreign Application Priority Data

Apr. 14, 1993 [DE] Germany ............... 43 12 120.9

[51] Int. Cl.$^6$ ................................................. G06F 15/18
[52] U.S. Cl. ...................... 395/3; 395/61; 395/900
[58] Field of Search .................... 395/3, 61, 900

[56] References Cited

U.S. PATENT DOCUMENTS 5,245,695  9/1993  Basehore ........................... 395/3
5,371,832  12/1994  Eichfeld et al. ..................... 395/3

FOREIGN PATENT DOCUMENTS 0424890  5/1991  European Pat. Off. .
4225758  2/1994  Germany ................. G06F 15/20

OTHER PUBLICATIONS

Patent Abstracts of Japan, vol. 4, No. 160 (P–035) for Japanese Patent Application 55108050.
"High Speed Multiplier," IBM Technical Disclosure Bulletin, vol. 13, No. 2, Jul., 1970 (pp. 546–548).
"An 8b Fuzzy Coprocessor for Fuzzy Control," Eichfeld et al., 1993 IEEE International Solid–State Circuits Conference, Digest of Technical Papers, Feb., 1993 pp. 180–181, 286.
"Parallel Dynamic Switching of Reasoning Methods in a Fuzzy System," Smith, Second IEEE International Conference on Fuzzy Systems, vol. II, pp. 968–973.

Primary Examiner—Robert W. Downs
Assistant Examiner—A. Katbab
Attorney, Agent, or Firm—Hill, Steadman & Simpson

[57] ABSTRACT

An apparatus for inference formation and defuzzification has an arithmetic unit, a memory/register unit, and a controller, wherein crisp output signals can be formed from weighting factors and dimensional scaling numbers dependent on control signals with a weighting factor being provided for each linguistic value of the output variables, the dimensional numbers characterizing the membership functions of the linguistic values of the output variables. The apparatus exhibits high processing speed and requires only low storage space, particularly given definitions of the crisp output signal of greater than or equal to eight bits.

5 Claims, 3 Drawing Sheets

APPARATUS FOR INFERENCE FORMATION AND DEFUZZIFICATION IN A HIGH-DEFINITION FUZZY LOGIC CO-PROCESSOR

BACKGROUND OF THE INVENTION

1. Field Of the Invention

The present invention is directed to an apparatus for inference formation and defuzzification of the type suitable for use in a fuzzy logic co-processor.

2. Description of the Prior Art

German OS 42 25 758 discloses a fuzzy logic co-processor which includes an apparatus for inference formation and defuzzification. The fuzzy logic co-processor is in the form of a fuzzy logic controller which forms an uncrisp set in an inference unit from weighting factors and from values of the membership functions of the linguistic values of the output variables, and forms a crisp output signal from the uncrisp set in a subsequent defuzzification unit.

SUMMARY OF THE INVENTION

It is an object of the present invention to provide an apparatus for inference formation and defuzzification for use in a fuzzy logic co-processor, which, given a chip area comparable to the chip area in known inference formation and defuzzification units, achieves a higher processing speed and a smaller knowledge-base memory.

It is a further object of the invention to provide such an apparatus which achieves the above advantages in a fuzzy logic co-processor having a definition greater than or equal to eight bits, without the necessity of accepting significant unwanted compromises in the control properties of the fuzzy logic co-processor.

The objects are achieved in accordance with the principles of the present invention in an apparatus for inference formation and defuzzification which includes an arithmetic unit, a memory/register unit and a controller, the controller forming crisp output signals from weighting factors and dimensional numbers dependent on control signals, with a weighting factor being provided for each linguistic value of the output variables and the dimensional numbers characterizing the membership functions of the linguistic values of the output variables.

DESCRIPTION OF THE PREFERRED EMBODIMENTS

Figure 1:
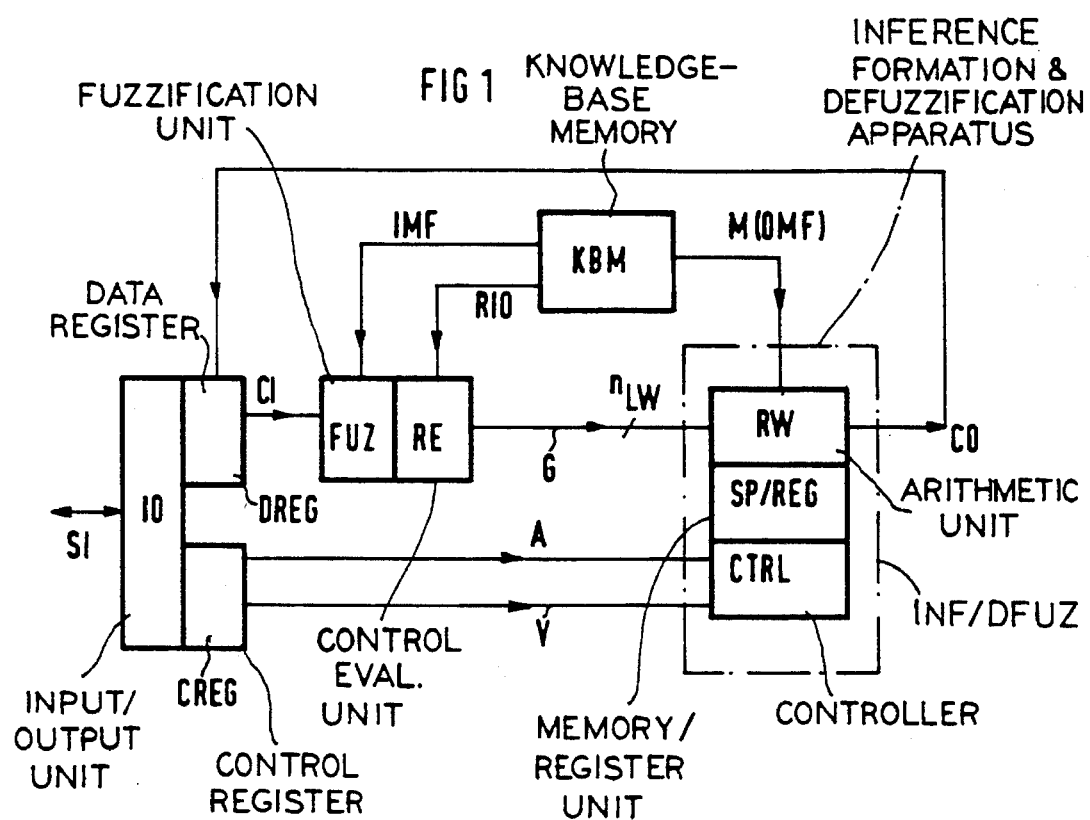
FIG. 1 is a block circuit diagram of a fuzzy logic controller which includes the apparatus of the invention for inference formation and defuzzification.

The fuzzy logic controller shown in a block circuit diagram in FIG. 1 has an input/output unit IO having, for example, a data register DREG and, for example, a control register CREG, a fuzzification unit FUZ, a control evaluation unit RE, a knowledge-base memory KBM and an apparatus INF/DFUZ of the invention for inference formation and defuzzification.

The apparatus of the invention is composed of an arithmetic unit RW, a memory/register unit SP/REG and a controller CTRL. The data register DREG and the control register CREG of the input/output unit IO can be read or written via an interface SI. Crisp input values CI derived from the data register DREG are processed in the fuzzification unit together with values of the membership function IMF of the linguistic values of the input variables and are processed in the following control evaluation unit RE with values RIO for control formation to form so-called aggregated weightings G. The values of the membership function IMF and the values RIO are derived from the knowledge-base memory KBM. The aggregated weightings include a respective weighting factor per linguistic value of the output variables, i.e. $n_{LW}$ weighting factors, whereby $n_{LW}$ denotes the number of linguistic values of the output variables.

Differing from known fuzzy logic controllers, values of the membership function OMF of the linguistic values of the output variables are no longer processed in the apparatus INF/DFUZ of the invention in common with the weighting factors G to form crisp output values CO. The INF/DFUZ apparatus contains an arithmetic unit RW, a memory/register unit SP/REG, and a controller CTRL. While foregoing the complete form information and overlap of the membership functions, the crisp output values CO in the apparatus INF/DFUZ of the invention can be formed from the weighting factors and from dimensional numbers M(OMF) that characterize the membership functions of the linguistic values of the output values, and, for example, can be supplied to the data register DREG.

The inference formation, i.e. the weighting of the membership functions of the linguistic values of the output variables on the basis of the weighting factors G, does not ensue on the basis of minimum formation, i.e. by clipping the membership functions on the weighting level, but instead ensues by product formation. As a result, a number of calculating steps are independent of the weighting factors G and can thus be calculated in advance and be stored in the knowledge-base memory KBM as dimensional numbers M(OMF). When a defuzzification ensues according to the "center of gravity" method COG, then, for example, it is adequate that one center of gravity coordinate of the respective membership function be stored as a first dimensional number S and the area of the respective membership function is stored as a second dimensional number F in the knowledge-base memory KBM, for each linguistic value of the output variables.

Given a defuzzification according to the so-called MOM method (mean of maximum) or according to a new method referred to as MMM (middle member of maximum), which shall be set forth in greater detail below, only a third dimensional number H which indicates the maximum value of the membership function of the respective linguistic value of the output variables, a fourth dimensional number B which indicates the number of elements that a maximum membership value has, and a fifth dimensional number P that represents a mean value of all elements at which the respective membership function reaches its maximum membership value, are required per linguistic value of the output variable. By employing these five dimensional numbers per linguistic value instead of the values for the membership function of the respective linguistic value, many calculating steps can be implemented in advance and the storage space for the membership functions of the linguistic values for the output variables can be drastically reduced. The calculating time $t_R$ and the storage space S required for the dimensional numbers are recited in the following table dependent on the definition $a_x$ of the crisp output value of a fuzzy logic controller in percentages, whereby 100% respectively corresponds to the value of the known, initially cited fuzzy logic controller.

TABLE

| $a_x$ | 6 Bits | 8 Bits | 10 Bits | 12 Bits | 14 Bits | 16 Bits |
|---|---|---|---|---|---|---|
| $t_R$ | 250% | 74% | 22% | 6% | 1.8% | 0.5% |
| S | 34% | 8.3% | 2% | 0.51% | 0.13% | 0.03% |

It is clear from the above table that fuzzy logic controllers, particularly fuzzy logic controllers having high definition, for example 16 bits, can be advantageously equipped with an apparatus (INF/DFUZ) of the invention for inference formation and defuzzification.

The controller CTRL can be driven by method selection signals V and signals A for determining the output definition, whereby the signals A and V are derived from the control register CREG. In a specific fashioning of the apparatus of the invention, a method selection signal V that is 5 bits wide is employed for the selection of 9 defuzzification methods and a signal that is 3 bits wide is employed for determining the definition A. The aforementioned COG method, the aforementioned MOM method and the aforementioned MMM method, and a so-called first max (or last max) method wherein the element at which the maximum value of the uncrisp reassembled set is achieved for the first (or last) time is utilized as the crisp output value, were provided. Further, it is preferable not only to provide membership functions but also to provide for so-called singletons, wherein the membership functions have an area of one, and are respectively concentrated on one element of the definition area. Given employment of singletons, defuzzification according to the MMM method does not differ from the MOM method for singletons, and was therefore not provided for singletons.

A further improvement of the operating speed can be achieved in operating instances wherein only a lower definition than the maximally possible definition of the crisp output signal is required. In those instances, the controller CTRL can be so informed by the signal A, and as a result, for example, the controller CTRL causes the arithmetic unit RW to execute a reduced number of addition/shift steps, or subtraction/shift steps, in a multiplication or division.

Figure 2:
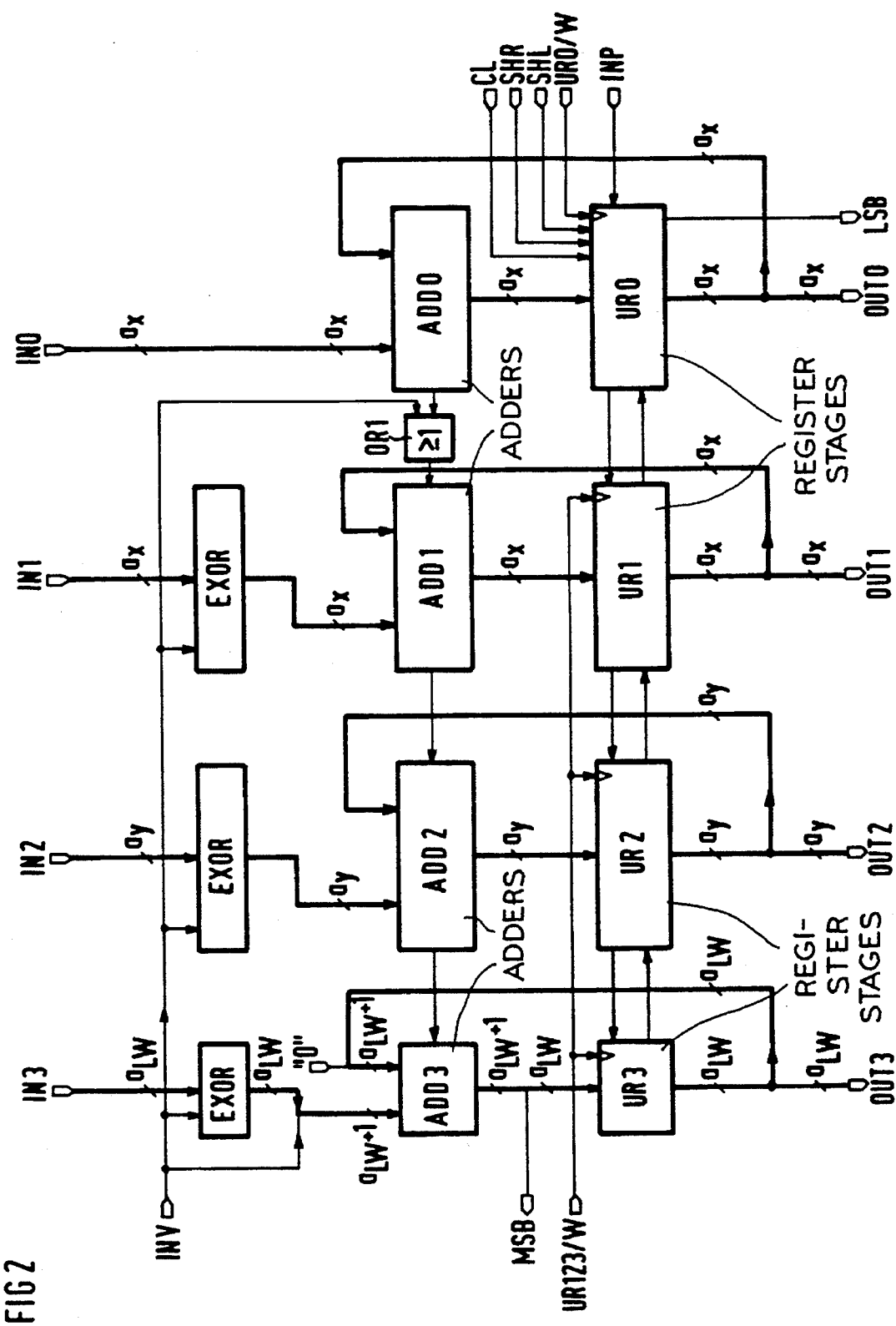
FIG. 2 is a detailed circuit of an arithmetic unit contained in the apparatus of the invention.

FIG. 2 shows a possible arithmetic unit RW in detail and, as main components, contains adders ADD0 ... ADD3 and a universal register that is grouped into register stages UR0 ... UR3. The universal register is composed of a left/right shift register that can be loaded in parallel and read out in parallel. The content of the universal register stages UR0 ... UR3 can be erased by a cancel signal CL, can be shifted toward the right by a signal SHR and can be shifted to the left by a signal SHL. The register stage UR0 has a serial data input INP whose data can be entered independently of a write signal UR0/W in the register part UR0. The adder ADD0 has an input side connected to a data bus IN0 and has an output side connected to the register stage UR0, whose output OUT0 is fed back onto the second input of the adder ADD0. The word width of the bus IN0, of the adder ADD0 and of the register stage UR0 is $a_x$ bits, whereby $a_x$ represents the definition of the crisp output value CO. The adder ADD1 has an input side connected bit-by-bit via exclusive OR gates EXOR to a data bus IN1 and has an output side connected to the register stage UR1, whose output OUT1 is fed back to the second input of the adder ADD1. The word width of the bus IN1, of the adder ADD1 and of the register stage UR1 likewise is $a_x$ bits. The adder ADD2 has an input side connected bit-by-bit via EXOR gates exclusive OR to a data bus IN2 and has an output side connected to the register stage UR2, whose output OUT2 is fed back onto the second input of the adder ADD2. The word width of the bus IN2, of the adder ADD2 and of the register stage UR2 is $a_y$, whereby $a_y$ denotes the definition of the membership values in bits. The adder ADD3 has an input side connected bit-by-bit via exclusive OR gates EXOR to a data bus IN3 and has an output side connected to the register stage UR3, whose output OUT3 is fed back to the second input of the adder ADD3. The word width of the bus IN3 and of the register stage UR3 is $a_{LW}$ bits, whereby $a_{LW}$ denotes the definition of the number of linguistic values in bits. The word width ADD3 is $a_{LW}+1$ bits and the most significant bit at the first input of the adder ADD3 supplies an inversion signal INV and the most significant bit of the second input of the adder ADD3 supplies with a logical zero. The most significant bit MSB of the adder ADD3 supplies the controller CTRL with the operational sign of the addition result and the least significant bit LSB of the register stage UR0 is evaluated by the controller CTRL in the implementation of multiplications. Due to the inversion signal INV, the data of the buses IN1 ... IN3 can proceed to the first inputs of the adders ADD 1 ... ADD3 inverted or non-inverted. A carry of the adder ADD1 to the adder ADD2 and a carry of the adder ADD2 to the adder ADD3 occurs and a carry of the adder ADD0 can be operated in an OR operation OR1 with the inversion signal INV and can be supplied to the adder ADD1. In addition to effecting the inversion, the inversion signal INV thus simultaneously effects a setting of the carry bit of the adder ADD0. The inversion in combination with the carry bit serves the purpose of subtraction by forming the two's complement of the buses IN1 ... IN3. Since subtractions can only be undertaken in the register stages UR1 ... UR3, there is the possibility of transferring the addition results separately into the register part UR0 with the signal UR0/W and into the register stages UR1 ... UR3 with a signal UR123/W.

Figure 3:
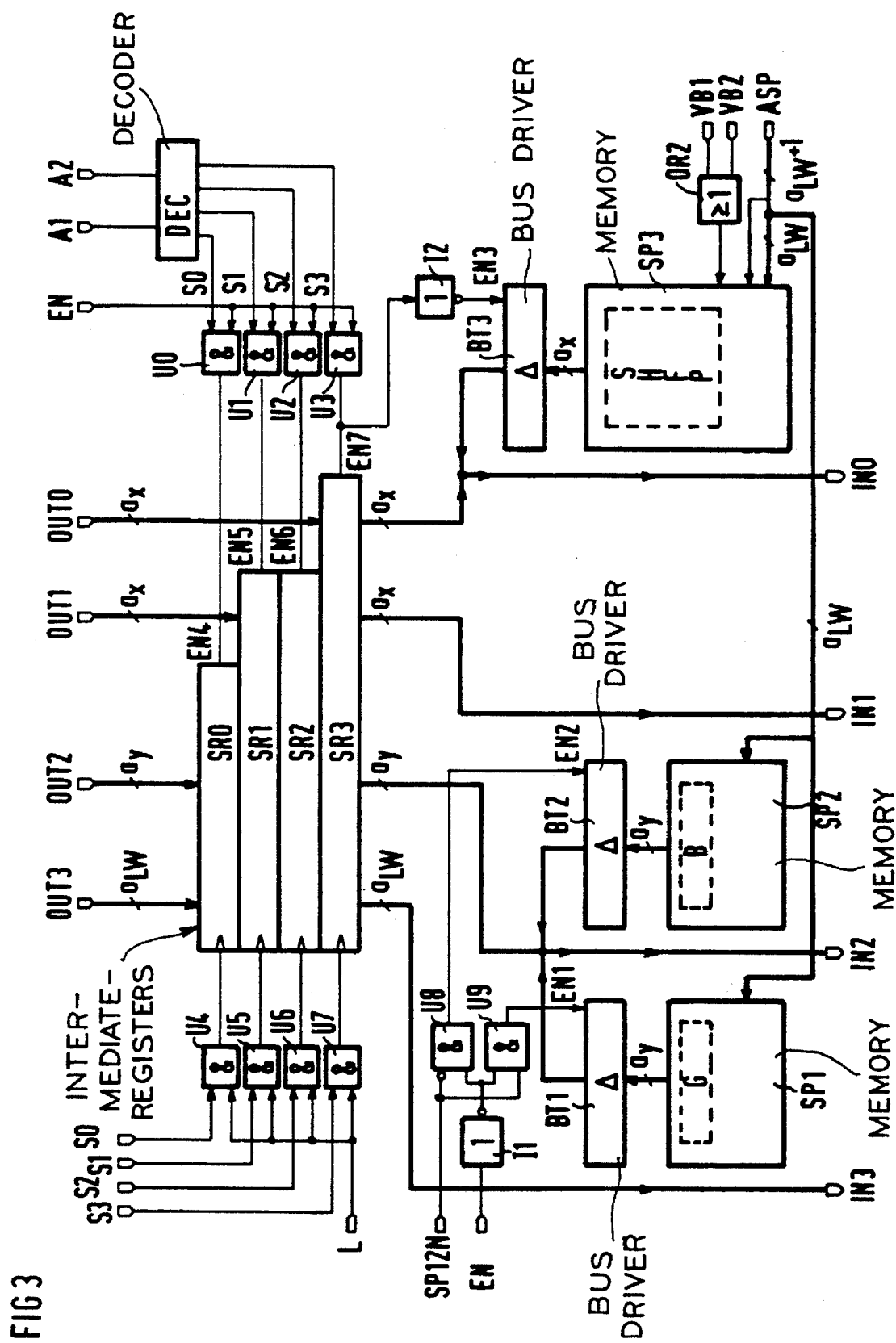
FIG. 3 is a detailed circuit of a memory/register unit contained in the apparatus of the invention.

A possible memory/register unit SR/REG is shown in detail in FIG. 3 and essentially contains four intermediate registers SR0 ... SR3 (scratch registers) and three memories SP1 ... SP3. The memory SP1 is provided for the weighting factor G, the memory SP2 is provided for the dimensional number B and the memory SP3 is provided for the dimensional numbers S, H, F and P. The intermediate register SR0 has an input side connected to the terminals OUT2 and OUT3 of the arithmetic unit and has an output side connected to the buses IN2 and IN3. The intermediate registers SR1 and SR2 have their data inputs wired to the terminals OUT 1 ... OUT3 of the arithmetic unit and have their data output wired to the buses IN1 ... IN3. The intermediate register SR3 has an input side connected to the terminals OUT0 ... OUT3 and has an output side connected to the buses IN0 ... IN3. From two selection bits A1 and A2, a one-of-four decoder DEC generates the bit-significant selector signals S0 ... S3 that can be respectively operated upon with an activation signal EN (enable) with the assistance of four AND gates U0 ... U3 to form an enable signal EN4 for the register SR0, an enable signal EN5 for the register SR1, an enable signal EN5 for the register SR2, and an enable signal EN7 for the register SR3. Further, the selector signals S0 ... S3 can be respectively operated upon via AND gates U4 ... U7 with a lock signal L to form a write signal for the register SR0, a write signal for the SR1, a write signal for the register SR2, and a write signal for the register SR3. The memory SP1 can be connected to the bus IN2 via a bus driver BT1 and the memory SP2 can be connected to the bus IN2 via the bus driver BT2. The bus driver BT1 is activated by an enable signal EN1 and the bus driver BT2 is activated by an enable signal EN2 and applies the respective memory data to the bus IN2. The enable signal EN, inverted by an inverter I1, is operated with a memory selection signal SP12N in an AND gate U9 and supplies the enable signal EN1. Further, the enable signal inverted by the inverter I1 is operated with the inverted memory selection signal SP12M in an AND gate U8 and supplies the enable signal EN2. The memory SP3 can be applied onto the bus IN0 via a bus driver BT3, whereby the bus driver BT3 receives an enable signal EN3, causing the enable signal EN7 for the register SR3 to be supplied to it via an inverter 12. Except for the least significant address A1 with a word width of $a_{LW}$ bits, memory addresses ASP in the memories SP1 and SP2 can be supplied, so that the weighting factor and the dimensional number B for every linguistic value can be addressed. Since the memory SP3 contains four times the data as, for example, the memory SP1 or the memory SP2, it requires two addition address lines for addressing. These lines supply the LSB of the memory address ASP and an address signal that, for example, can be formed in an OR gate OR2 from two bits VB1 and VB2 of the method selection signal V.

The selection bits A1 and A2, the memory selection signal SP12, the lock signal L, the enable signal EN, the memory address ASP for the memories SP1 . . . SP3, the serial input signal INP for the universal register UR0, the write signal UR0/W and UR123/W, the cancel signal CL and the shift signals SHR and SHL for the universal register UR0 . . . UR3 as well as the inversion signal INV can be formed in the controller CTRL from a clock signal, the signal A for defining the definition and from the method selection signal V. For example, the controller CTRL can from these signals using discrete components such as gates, flip flops and counters, or can automatically generate these signals computer-assisted, with a hardware description language, for example VHDL (VHDL=VHSIC Hardware Description Language). The desired control signals and their sequence are programmed in an abstract form, from which a controller, whose discrete structure is unimportant can then be "generated" by computer.

As mentioned above, a plurality of defuzzification methods are possible with the assistance of the apparatus INF/DFUZ of the invention, as set forth in greater detail below in examples with reference to the center of gravity method COG, the MOM method and the MMM method in order to enable a hardware description of the controller CTRL.

In defuzzification according to the center of gravity method (COG), the product of the dimensional number F for the respective area and the respective weighting factor G is formed for every linguistic value of the output variables and these products are summed to form an overall area and, as a result, an inference formation is effected. Further, the product of the dimensional number F for the respective surface, the dimension number S for the respective center of gravity coordinate, and the respective weighting factor G is formed for every linguistic value of the output variables, and these products are added to form an overall moment. The crisp output value CO is subsequently calculated from the quotient of the overall moment divided by the overall surface.

To this end, the respective weighting factor is read out from the memory SP1 and the respective area of the linguistic value is read out from the memory SP3 and the universal register stages UR0 . . . UR3 is erased, and subsequently the content of the memory SP3 is transferred into the universal register stage UR0. Thereupon, a multiplication of the content of the universal register stage UR0 by the data on the bus IN2 ensues, the result residing in the universal registers stages UR2 and UR1. To this end, a transfer of the data of the adder output into the universal register stages UR1 through UR3 is implemented $a_x$ times when the signal LSB is equal to one, and subsequently the universal register stages UR0 . . . UR3 are shifted 1 bit toward the right. Following thereupon, the content of the register stages UR1 . . . UR3, i.e. the weighted area, is transferred into the intermediate register SR2 and the address ASP is incremented by one. Following thereupon, the intermediate register SR1, i.e. the previous overall area, is read out and the content of this intermediate register is transferred into the register stages UR1 . . . UR3 and the sum of the weighted area and previous overall area is transferred into the intermediate register SR1 as the new overall area. For moment formation, the intermediate register SR2 with the weighted area for the respective linguistic value and the memory SP3 for the center of gravity of the respective linguistic value are read, and the content of the memory SP3, i.e. the center of gravity coordinate, is transferred into the register stage UR0. A multiplication of the content of the register stage UR0, i.e. of the center of gravity coordinate, with the data of the buses IN1 and IN2, i.e. of the weighted area, then ensues the multiplication result then residing in the register stages UR0 . . . UR2. The previous overall moment is then read from the intermediate register SR2 and is transferred into the universal register stages UR0 . . . UR3. Thereupon, the sum of the currently calculated moment and of the previous overall moment is transferred into the intermediate register SR3 as the new overall moment. The aforementioned processing steps are implemented for all linguistic values and—as soon as this has been carried out—the overall surface residing in the intermediate register SR1 is read out via the exclusive OR gates EXOR, i.e. in inverted form. The division of the overall moment residing in the universal register stages UR0 . . . UR3 by the content of the intermediate register SR1 ensues as follows. The MSB is intermediately stored, the signals of the adder outputs are transferred into the register stages UR1 . . . UR3 when the MSB is equal to zero, and the register parts UR0 and UR1 are shifted toward the left, whereby the intermediately stored MSB is stored in negated form. The steps for forming a division result are implemented $a_x+1$ times in order to obtain a round-off place. The division result then resides in the register stage UR0 from which it can be transferred into an output register, and this is indicated by a finished message of the fuzzy logic coprocessor.

In the implementation of the MOM method, the inference formation is effected by multiplying the dimensional number for the maximum value H of the membership function of the respective linguistic value of the output variable by the respective weighting factor G for every linguistic value of the output variables. A defuzzification is effected by comparing these products to one another and at least one linguistic value with a maximum product can be identified. If only one linguistic value having a maximum property is present the crips output is formed from the dimensional number B for that linguistic value. If more than one linguistic value having a maximum property are present, the dimensional number P belonging to the linguistic value having the maximum product for the mean value of the values at which the maximum value H is respectively reached is multiplied by the dimensional number B for the number of elements of the membership function of a respective linguistic value of the output variables. These products are added to form a sum, and the crisp output value CO is calculated by quotient formation from this sum divided by the sum of the dimensional numbers B for the number of elements of the membership function of the linguistic values of the output variables.

To this end, the memory SP1, i.e. the respective weighting factor G, and the memory SP3, i.e. the respective dimensional number H, are read out and the universal register stages UR0 . . . UR3 are erased. Thereupon, a transfer of the content of the memory SP3, i.e. the respective dimensional number H, ensues into the register stage UR0. A multiplication of the content of the register stage UR0 by the signal of the bus IN2 now occurs, the multiplication result residing in the register stages UR2 and UR3. The content of the register stages UR1 . . . UR3, i.e. the respective, weighted dimensional number H, is transferred into the intermediate register SR2 and the address ASP is incremented by one. The intermediate register SR1, i.e. the maximally weighted dimensional number M, is supplied inverted to the adder, the MSG is intermediately stored in a first flip flop and the intermediate register SR1 is read out. The content of the intermediate register SR1 is transferred into the register stages UR1 . . . UR3 and the content of the intermediate register SR2, i.e. the newly weighted dimensional number H, is supplied inverted to the adder inputs. Thereupon, the MSB is stored in a second flip flop and the content of the second intermediate register SR2, i.e. the newly weighted dimensional number H, is supplied to the bus and the register stages UR1 . . . UR3 are transferred. The content of the universal register is stored in the intermediate register SR1 insofar as the second flip flop contains a logical one. Thereupon, the memory SP2, i.e. the respective dimensional number B, is read out and the universal register is erased. The content of the memory SP2 is now transferred into the register stages UR1 . . . UR3 and the intermediate register SR0, i.e. the previous sum of all dimensional numbers B, is read out. Insofar as the first and the second flip flops are at a logical zero, the signals at the adder outputs are transferred into the universal register stages UR0 . . . UR3 and the content of the universal register is stored in the intermediate register SR0 insofar as the first flip flop is at a logical zero, i.e. the newly weighted dimensional number H is greater than or equal to the previous, maximally weighted dimensional number H. The memory SP2, i.e. the respective dimensional number B, and the memory SP3, i.e. the dimensional number H, are read out and the content of the memory SP3 is transferred into the register stage UR0. A multiplication of the content of the register stage UR0 with the signal of the bus IN2, i.e. the dimensional number B, now ensues, whereby the multiplication result resides in the register stages UR1 and UR2. The intermediate register SR3 is read out and transferred into the universal register stages UR0 . . . UR3 insofar as the first and second flip flop are at a logical zero and the sum of the previous content of the intermediate register SR3 and the multiplication result is transferred into the intermediate register SR3 insofar as the flip flop 1 is at a logical zero. When the aforementioned steps have been performed for all linguistic values, the intermediate register SR3 is read out and the universal register is erased. A transfer of the content from the intermediate register SR3 into the universal register stages UR0 . . . UR3 now ensues and the intermediate register SR0 is read out via the exclusive OR gates EXOR acting as an inverter. A division of the content of the universal register by the content of the intermediate register SR0 now ensues, thereby forming the mean value, the result residing in the register stage UR0. At the end, a transfer of the content of the register stage UR0 into an output register ensues and a finished message of the fuzzy logic controller is generated.

In defuzzification according to the MMM method, the inference formation ensues as in the MOM method. Thereafter, the products formed in the inference are compared to one another and at least one linguistic value having a maximum product is identified. The sum of the dimensional numbers B of linguistic values having the maximum product is now formed, a further dimensional number B of the linguistic value having a maximum product is added in every summation step to form a total sum. During a renewed summation of the dimensional numbers B of linguistic values having the maximum product, a running sum formed in the renewed summation is compared to half the total sum of all dimensional numbers B of linguistic values having a maximum product. When the running sum is greater than half the total sum of the dimensional numbers B of linguistic values having a maximum product, then the crisp output values CO is calculated by adding of the dimensional number P of the linguistic value in the respective summation step to half the dimensional number B of the linguistic value in the respective summation step, and subtracting half the sum of the dimensional numbers B of linguistic values having a maximum product. Insofar as the running sum is still not greater than half the sum of the dimensional numbers B of linguistic values having a maximum product, half the sum in every summation step is reduced by the dimensional number B of the linguistic value of the respective summation step.

Although modifications and changes may be suggested by those skilled in the art, it is the intention of the inventors to embody within the patent warranted hereon all changes and modifications as reasonably and properly come within the scope of their contribution to the art.

We claim as our invention:

1. A system for inference formation and defuzzification for use with a source of fuzzy variables, each of said fuzzy variables having a plurality of respective linguistic values associated therewith, said system comprising:

knowledge-base memory means for generating a plurality of dimensional numbers corresponding to membership functions of said linguistic values for each fuzzy variable, said knowledge-base memory means comprising means for generating a first dimensional number indicating an area of a membership function and, a second dimensional number indicating a center of gravity of said membership function for each linguistic value of a fuzzy output variable;

memory means for storing a weighting factor for each of said linguistic values; and arithmetic means, supplied with said dimensional numbers and said weighting factors, for mathematically operating on said dimensional numbers and said weighting factors to produce a crisp output signal from each fuzzy variable, said arithmetic means comprising means for multiplying said first dimensional number by a weighting factor for each linguistic value of a fuzzy output variable and summing all of said products to form an overall area, and means for conducting defuzzification according to the center of gravity method including means for producing a further product of said first dimensional number said second dimensional number for each linguistic value and said weighting factor for each linguistic value means for summing said second products to form an overall moment, and means for forming said crisp output value by forming the quotient of said Overall moment divided by said overall area.

2. An apparatus for inference formation and defuzzification for use with a source of fuzzy variables, each of said fuzzy variables having a plurality of respective linguistic values associated therewith, said apparatus comprising:

knowledge-base memory means for generating a plurality of dimensional numbers corresponding to membership functions of said linguistic values for each fuzzy variable, said knowledge-base memory comprising means for generating a first dimensional number representing a maximum value of the membership function for each linguistic value of a fuzzy variable and a second dimensional number representing the mean value of the linguistic values at which said maximum value is reached, and a third dimensional number representing the number of elements of the membership function for each linguistic value of a fuzzy variable;

memory means for storing a weighting factor for each of said linguistic values; and arithmetic means supplied with said dimensional numbers and a said weighting factors, for mathematically operating on said dimensional numbers and said weighting factors to produce a crisp output signal from each fuzzy variable, said arithmetic means including means for forming a product of said first dimensional number and a weighting factor for each linguistic value of a fuzzy output variable.

3. An apparatus as claimed in claim 2 wherein said arithmetic means comprises means for defuzzification according to the mean of maximum method including means for comparing said products to each other to identify a linguistic value having a maximum product and, if only one linguistic value having a maximum product is present, for forming said crisp output signal from said second dimensional number for the linguistic value having said maximum product, and means, if a plurality of linguistic values having said maximum product are present, for multiplying the second dimensional number of each linguistic value having said maximum product by said third dimensional number to obtain a plurality of products, means for adding said plurality of products to form a sum, and means for generating said crisp output signal by forming a quotient of said sum divided by a sum of said third dimensional numbers for each of said linguistic values having said maximum product.

4. An apparatus as claimed in claim 2 wherein said arithmetic means comprises means for defuzzification according to the middle member of maximum method, including means for comparing said products to each other and for identifying at least one linguistic value having a maximum product, means for conducting a first summation of the second dimensional numbers of each linguistic value having said maximum product to form a sum, means for conducting a second summation of said second dimensional numbers for each linguistic value having said maximum product and thereby generating a running sum, means for comparing after each addition in said second summation, said running sum to half of said sum, means, if said running sum is greater than half said sum, for calculating said crisp output signal by adding the first dimensional number of a linguistic value last-added during said second summation and half of the second dimensional number of said last-added linguistic value and subtracting half of said sum, and, if said running sum is not greater than half said sum, for reducing half said sum in each summation step by the second dimensional number of said last-added linguistic value.

5. A system as claimed in claim 1 wherein said source of fuzzy variables, said knowledge-base memory means, said memory means and said arithmetic means are contained in a fuzzy logic co-processor having a definition of said crisp output values of greater than or equal to eight bits.

* * * * *